(12) United States Patent
Lenor et al.

(10) Patent No.: US 12,493,104 B2
(45) Date of Patent: Dec. 9, 2025

(54) METHOD FOR DETERMINING A SENSOR DEGRADATION STATUS

(71) Applicant: Robert Bosch GmbH, Stuttgart (DE)

(72) Inventors: Stephan Lenor, Gerlingen (DE); Andreas Scharf, Stuttgart (DE); Zsolt Vizi, Szeged (HU); Johann Klaehn, Mannheim (DE); Christian Wolf, Walddorfhaeslach (DE)

(73) Assignee: Robert Bosch GmbH, Stuttgart (DE)

( * ) Notice: Subject to any disclaimer, the term of this patent is extended or adjusted under 35 U.S.C. 154(b) by 262 days.

(21) Appl. No.: 18/246,473

(22) PCT Filed: Sep. 27, 2021

(86) PCT No.: PCT/EP2021/076477
§ 371 (c)(1),
(2) Date: Mar. 23, 2023

(87) PCT Pub. No.: WO2022/069399
PCT Pub. Date: Apr. 7, 2022

(65) Prior Publication Data
US 2023/0366981 A1     Nov. 16, 2023

(30) Foreign Application Priority Data
Sep. 30, 2020   (DE) .................. 10 2020 212 331.4

(51) Int. Cl.
*G01S 7/40* (2006.01)
*G01S 7/497* (2006.01)
(Continued)

(52) U.S. Cl.
CPC ............ *G01S 7/4004* (2013.01); *G01S 7/497* (2013.01); *G01S 7/52004* (2013.01);
(Continued)

(58) Field of Classification Search
None
See application file for complete search history.

(56) References Cited

U.S. PATENT DOCUMENTS 9,221,396 B1 * 12/2015 Zhu ................. G01S 13/931
10,026,239 B2   7/2018 Kim et al.
(Continued)

FOREIGN PATENT DOCUMENTS

CN          108508872 A      9/2018
DE   10 2015 205 180 A1     9/2016
(Continued)

OTHER PUBLICATIONS

International Search Report corresponding to PCT Application No. PCT/EP2021/076477, mailed Feb. 15, 2022 (German and English language document) (5 pages).

*Primary Examiner* — Bernarr E Gregory
(74) *Attorney, Agent, or Firm* — Maginot, Moore & Beck LLP

(57) ABSTRACT

A method for determining a sensor degradation status of a first sensor system includes: providing data of the first sensor system to represent the environment; providing data of a second sensor system to represent the environment; determining an individual blindness indicator for the first sensor system on the basis of sensor data exclusively of the first sensor system; determining at least one first environment-related determination variable based on the provided data of the first sensor system; determining at least one second environment-related determination variable based on the provided data of the second sensor system; determining a fusion blindness indicator based on a comparison of the at least one first environment-related determination variable with the at least one second environment-related determination variable; and determining the sensor degradation (Continued)

status of the first sensor system based on of the individual blindness indicator and the fusion blindness indicator.

18 Claims, 1 Drawing Sheet

(51) Int. Cl.
 *G01S 7/52*   (2006.01)
 *G01S 13/86*   (2006.01)
 *G01S 13/931*   (2020.01)
 *G01S 15/86*   (2020.01)
 *G01S 15/931*   (2020.01)
 *G01S 17/931*   (2020.01)

(52) U.S. Cl.
 CPC ............ *G01S 13/86* (2013.01); *G01S 13/931* (2013.01); *G01S 15/86* (2020.01); *G01S 15/931* (2013.01); *G01S 17/931* (2020.01); *G01S 2007/4975* (2013.01); *G01S 2007/52009* (2013.01)

(56) References Cited

U.S. PATENT DOCUMENTS

| | | | |
|---|---|---|---|
| 10,600,257 | B2 | 3/2020 | Jiang et al. |
| 11,474,202 | B2 * | 10/2022 | Alvarez ................. G01S 13/931 |
| 2010/0131140 | A1 * | 5/2010 | Wu ........................... G01P 3/50 |
| | | | 701/31.4 |
| 2014/0032167 | A1 * | 1/2014 | Mayer ................... G01S 13/865 |
| | | | 702/179 |
| 2014/0142800 | A1 * | 5/2014 | Zeng ..................... G01S 13/931 |
| | | | 701/30.6 |
| 2017/0169627 | A1 | 6/2017 | Kim et al. |
| 2020/0207362 | A1 | 7/2020 | Nishida et al. |

FOREIGN PATENT DOCUMENTS

| | | |
|---|---|---|
| EP | 3 073 287 A1 | 9/2016 |
| JP | 2000-28715 A | 1/2000 |
| JP | 2007-293672 A | 11/2007 |
| JP | 2008-267839 A | 11/2008 |
| JP | 2019-144246 A | 8/2019 |
| JP | 2019-152492 A | 9/2019 |

\* cited by examiner

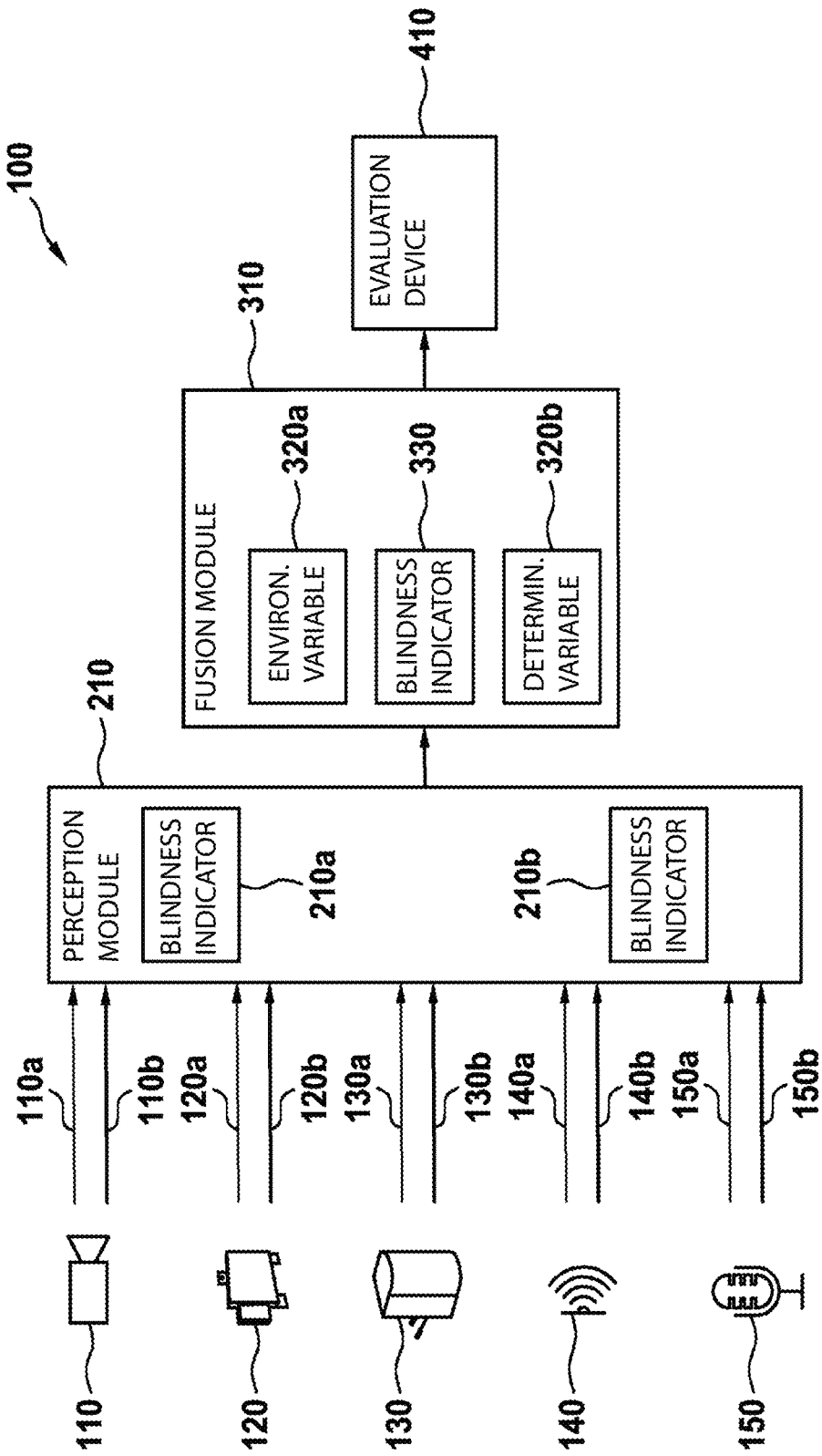

METHOD FOR DETERMINING A SENSOR DEGRADATION STATUS

This application is a 35 U.S.C. § 371 National Stage Application of PCT/EP2021/076477, filed on Sep. 27, 2021, which claims the benefit of priority to Serial No. DE 10 2020 212 331.4, filed on Sep. 30, 2020 in Germany, the disclosures of which are incorporated herein by reference in their entirety.

BACKGROUND

The automation of driving is accompanied by equipping vehicles with ever more extensive and more powerful sensor systems for environment detection. In some cases, vehicle sensors cover 360° of the environment and different ranges, redundantly using a plurality of sensors and modalities. For example, video, radar, lidar, ultrasound, and microphone sensors are used as modalities.

Sensor data are combined to represent an environment of the vehicle to form a supported environment model. Requirements for a scope and a quality of the environment model are in turn dependent on the driving functions implemented on the model. In the driverless vehicle, for example, fully comprehensive driving decisions are made on the basis of the environment model and the actuators are controlled accordingly.

Each of the sensors may be limited or "degraded" as compared to its nominal performance due to dirt, traces of use, damage, or other environmental conditions such as rain, snow, and fog. The effects and their expression in the sensor data depend on, among other things, the sensor modality.

SUMMARY

Data from sensor systems are processed to represent an environment of a vehicle in different processing steps using different modules, the data being further abstracted with each processing step and ultimately being combined to form a supported environment model. Here, the commonly used algorithms for different sensor modalities for object detection, object classification, object tracking, distance calculation, etc. are susceptible to degraded input data. Typical approaches to object detection and classification fail in these cases due to false positive and false negative detections without detecting their degraded state.

False negative degradation detections are an unacceptable safety risk in almost every case, since data from "blind" sensors in the form of undetected or falsely detected objects can, while going unnoticed, become the cause of safety-relevant wrong decisions.

False positive degradation detections for their part reduce "only" the availability of the system, since a system degradation derived from sensor degradation takes place unnecessarily. Since it is possible to return to the driver in automation levels 1-3 (with driver), false positives are more likely to be accepted than in the automation level 4-5 (without driver), where the vehicle is restricted in its driving task by overdegradation (up to standstill), which is unacceptable for application.

In particular, in this context the false positive rates of the degradation detections are a challenge for the step to highly autonomous driving, thus resulting in the need for improved degradation detection of the sensor systems.

Errors in the environment detection of a sensor system can lead to functional wrong decisions in the higher-level system. Depending on the implemented function, safety risks or impairment of comfort can occur as a result. Sensor systems in vehicles can be equipped with separate blindness detection. As a result of detection mechanisms for sensor blindness, the functions realized in the overall system on the sensor data can be adequately marked as degraded for the current sensor availability.

In other words, data is generated by sensor systems in order to realize system functions using the sensor data. If an availability of the sensor system is known, for example due to a reliable blindness detection, an availability of the system functions can be derived therefrom. That is, a system can only diagnose or identify adequate degradation of system functions through good detection of sensor degradation. This means that, for example if the environment is only partially detected, corresponding functions can only be provided in a correspondingly partially restricted manner due to local blindness of the system.

According to aspects of the disclosure, a method for determining a sensor degradation status of a sensor system, a method for providing a control signal, an evaluation device, a computer program product, and a machine-readable storage medium are proposed. Advantageous embodiments are the subject matter of the following description.

Throughout this description of the disclosure, the sequence of method steps is shown in such a way that the method is easy to understand. However, the person skilled in the art will recognize that many of the method steps can also be run through in a different order and result in the same or a corresponding result. In this sense, the sequence of the method steps can be changed accordingly. Some features are provided with numbers to improve readability or make the assignment clearer, although this does not imply a presence of certain features.

According to one aspect of the disclosure, a method for determining a sensor degradation status of a first sensor system is proposed, wherein the sensor system is configured to provide data for representing an environment of the first sensor. The method has the following steps:

In one step of the method, data of the first sensor system are provided in order to represent the environment. In a further step, data of a second sensor system are provided in order to represent the environment. In a further step, for the first sensor system an individual blindness indicator that is based on sensor data exclusively of the first sensor system is determined. In a further step, at least one environment-related determination variable that is based on the provided data of the first sensor system is determined. In a further step, the at least one environment-related determination variable is determined on the basis of the provided data of the second sensor system. In a further step, a fusion blindness indicator is determined by a comparison of the at least one environment-related determination variable that is based on the provided data of the first sensor system with the at least one environment-related determination variable that is based on the provided data of the second sensor system. In a further step, the sensor degradation status of the first sensor system is determined by means of the individual blindness indicator of the first sensor system and the fusion blindness indicator.

Alternatively or additionally, the fusion blindness indicator for the first sensor system can be determined by means of a comparison of the at least one environment-related determination variable that is based on the provided data of the first sensor system with the at least one environment-related determination variable that is based on the provided data of the second sensor system. Accordingly, in a further step, the sensor degradation status of the first sensor system can then be determined by means of the individual blindness indicator of the first sensor system and the fusion blindness indicator of the first sensor system.

Using the method for determining a sensor degradation status, a current sensor degradation status can be determined for a relevant sensor system. Here, a sensor degradation status characterizes all the performance-relevant impairments that the sensor system can experience during its operating time, for example due to rain, snow, scratches, fog, glare, a low sun, leaves, and other contaminants. Since not every sensor modality is equally affected by the above causes, the impairments do not have to be detected as impairments for every sensor modality.

The individual method steps of the method for determining a sensor degradation status can be determined using a system distributed over one or more control devices. Since typically the representation of an environment is determined using data from sensor systems that pass through different processing levels until the representation is determined, advantageously in this method for determining the sensor degradation status the data and methods available at the relevant processing level are used to determine the sensor degradation status. Here, the corresponding sensor degradation status is not already determined at the sensor level; rather, the provided information is carried along to the last level on the basis of indicators in order to advantageously use the associated increase in information content for a reliable and consistent determination of the sensor degradation status. In particular, the inclusion of methods of the fusion level, in which data of different sensors, which may also have different modalities, are compared with one another, can be used to determine a sensor degradation status, so that a determination of the degradation status of a relevant sensor is no longer based solely on the data that the sensor itself provides. This determination of the sensor degradation status using this method can be distributed over a number of control devices and electronic subunits of these control devices.

Through a reliable detection of the degradation, a high sensor and system availability, in particular through a low false positive rate, can be ensured without endangering the safety of a vehicle, i.e., while maintaining a low false negative rate.

This method can be applied to a plurality of sensors and sensor modalities in order to determine a degradation. Through the use of methods that are used at the different levels for determining the representation of the environment at different levels of the data processing, the respective indicators can be integrated in a resource-saving manner into existing data processing for the representation of the environment.

Through the inclusion of the fusion level, strengths and weaknesses of the different sensor modalities can be balanced out. In addition, through the inclusion of the fusion level it is possible to redundantly validate results from a number of sensors.

The inclusion of the fusion level is necessary in particular for the increased requirements in level 4/5 of vehicle automation.

Through the integration into the processing architecture of the determination of the representation of the environment, the determination of the sensor degradation status can be combined and expanded. Weaknesses can be detected in a targeted manner by integrating additional detection mechanisms, without infringing the architectural principles.

If, for example, data of a sensor system are classified completely, in particular using a neural network, then a degradation class can additionally be defined and integrated into this classification in a resource-saving manner. Here, such a classification can be integrated in different ways by integrating a degradation class using superimposition or replacement, i.e., whether or not the data should still be examined for information for the environment model in the case of degradation detection. A prototype for such an architectural scenario is the pixel-wise semantic segmentation of camera images. A "blindness" class could be introduced in addition to classes such as "open space," "curb," "persons," etc.

Another example can be based on also including misassociations of objects in a fusion of data from different sensor systems. If in such a fusion a processing step is carried out by aligning or associating the current environment model with the sensor findings, a fusion degradation indicator can be determined here by including contradictions, with little additional effort.

The method can be integrated in a processing architecture that operates in distributed fashion over a plurality of control devices (ECU: electronic control unit) and nonetheless ensures a determination of a relevant sensor degradation status with the inclusion of all relevant information sources. For example, complex preprocessing steps, such as a determination of indicators using neural networks on images or point clouds on the control unit (ECU) and in the memory, can be performed at the location where the respective data are natively present. The method allows a high coverage of degradation causes and, if necessary, a best possible discrimination, since the final degradation decision is only made centrally, with the inclusion of all information.

In other words, the method for determining the sensor degradation status can be integrated into a signal processing chain for environment perception, e.g., in the field of automated driving functions. Here the sensor systems for environment perception can have one or more sensors of one or more sensor modalities. Typically, the environment perception is determined in a plurality of processing steps and on a plurality of control units (ECU), in particular when a plurality of sensors are used. In each of these processing steps, potentially useful indicators for the degradation detection can be obtained. In addition, the data can be present in a suitable form in each case between two processing steps, in order to examine said data in a dedicated manner for degradation. In this context, a degradation indication does not have to take place in each processing step and on all forms of data.

A degradation indicator is characterized in that it condenses degradation information, i.e., reacts to degradation scenarios or degradation causes and serves as a useful information source for determining the sensor degradation status. The degradation indicators can be forwarded to a central evaluation device in which the sensor degradation status is determined.

With the evaluation device, other information relevant in the downstream system can also be extracted and provided, such as for example a confidence measure for the determination of the sensor degradation status, contributions to the weather environment model, requirements for clearance or cleaning operations for the sensor systems, etc.

Here, the sensor degradation status can be realized with different granularity as required, e.g., divided into a relevant solid angle and/or divided according to a relevant range region, and/or divided according to an image region, and/or divided according to specific use cases of at least partially automated vehicles, such as lane changing, following another vehicle, or traffic light detection. For example, open space detection could still function while pedestrian detection is no longer possible.

According to one aspect, it is proposed that the fusion blindness indicator is determined by means of a trained neural network or a support vector machine and using the at least one environment-related determination variable that is based on the provided data of the first sensor system and the at least one environment-related determination variable that is based on the provided data of the second sensor system.

According to one aspect, it is proposed that the individual blindness indicator for the first sensor system has a sensor blindness indicator and/or a perception blindness indicator, the sensor blindness indicator being determined using sensor data provided exclusively by the first sensor system, and the perception blindness indicator, on the basis of a method for determining the environment-related determination variables, being determined using sensor data provided exclusively by the first sensor system, and the sensor degradation status of the first sensor system being determined accordingly by means of the sensor blindness indicator and/or the perception blindness indicator of the first sensor system and the fusion blindness indicator of the first sensor system.

A method for determining an environment-related determination variable evaluates, with respect to a measurement target, data of the first sensor system for the representation of the environment of the first sensor system. For example, a segmentation of an image or a stixel or an L-shape of a lidar system is evaluated with respect to the measurement target object detection, for example in order to detect and measure an object class car and to determine its position.

According to one aspect, it is proposed that the first sensor system is configured to provide a sensor-specific degradation indicator; and the sensor degradation status of the first sensor system is additionally determined by means of the sensor-specific degradation indicator provided by the first sensor system.

Such a sensor-specific degradation indicator can typically be provided by any sensor system as a self-diagnosis without carrying out an alignment with other sensor systems. In the following, examples of different self-diagnoses of different sensor modalities are presented, which are based on different strategies for determining a sensor degradation:

For ultrasound sensors, for example, blindness detection using natural frequency measurements on the sensor membrane can reliably detect contact dirt. This can be further developed by combination with information provided by other sensor systems.

For radar sensors, a degradation indicator can be derived from the signal processing level of the relevant radar sensor itself. Such a degradation indicator can be time-filtered in subsequent processing layers in order to suppress stochastic errors.

For video sensors, a degradation status can be determined using an image content, for example by classification of image contents or by evaluating the optical flow. If a degradation status cannot be determined using the image content, the method described herein can improve a determination of a degradation status for such a sensor.

Here, a degradation status can be derived using the optical flow, since certain degradations of a video sensor do not permit an optical flow to be determined at all (collapsing optical flow), or an inconsistent optical flow is then determined or, for example, an optical flow having a length of zero is determined because the image content is static.

Data from lidar sensors can be used to detect, distinguish, and quantify atmospheric phenomena in order to then combine this information with other sensors.

According to one aspect, it is proposed that an indicator confidence measure is additionally calculated for at least one of the degradation indicators. Such an indicator confidence measure makes it possible, when combining different degradation indicators of a relevant sensor system and/or different sensor systems, to allow contradictory degradation indicators and/or contradictory representations and/or environment-related determination variables of different sensor systems to enter into a determination of the sensor degradation status in a correspondingly weighted manner.

Such an indicator confidence measure can, for example, have values from a range [0,1] in order to allow, in the detection step, a weighting, related to the indicator confidence measure, of different blindness indicators, the weighting being based on the quality with which the blindness indicators were determined.

In an additional step of the method, the respective blindness indicators and/or indicator confidence measures can be time-filtered, e.g., in particular using an exponential filtering, in order to be made robust against temporary outliers.

According to one aspect, it is proposed that the first sensor system and the second sensor system have the same sensor modality and/or the first sensor system and the second sensor system have different sensor modalities.

The use of two sensor systems of the same modality makes it possible to easily detect defects in the sense of degradations of a single sensor system.

Sensor systems with different modalities allow determination of the sensor degradation status with a greater reliability, in particular when cross-comparisons are performed between sensor systems of different modalities using a model-based method.

According to one aspect, it is proposed that the comparison for the determination of a fusion blindness indicator for the first sensor system is object-based and/or model-based.

To determine a representation of an environment with at least two sensor systems, fused objects with object probabilities are typically formed. An object-based comparison for the determination of a fusion blindness indicator is based on a comparison of detected objects from at least two sensor systems, which can in particular have different modalities.

Here, in different aspects, an object redundantly identified by at least two different sensor systems can be compared according to a validation in order to determine a fusion blindness indicator. In other words, an alignment of an object detection by at least two different sensors takes place here.

If, for example, an object has been confirmed by at least two sensors and a third sensor does not detect the object, even though it should lie in its range of view, this is an indicator of sensor degradation or sensor decalibration of the third sensor. The decision can be supported using statistics or other indicators.

If at least two sensors contradict each other in their detection, this can be an indicator of problems with at least one of the sensors. Combined statistically over a plurality of observations or observation cycles, whether for example a particular sensor is always involved in the problem, or through combination with other indicators, such as for example sensor-based degradation indication takes effect for one of the sensors, this can lead to a degradation decision.

In this object-based comparison, participating sensors can have different sensor modalities.

Furthermore, such an object-based comparison can be carried out in such a way that a degradation indicator is determined separately as a function of angle ranges and/or distance ranges from the point of view of the relevant sensor system. For example, for a lidar sensor, a problem in a determination of an object may always occur in a "lower right" angular range or starting from a certain distance, which can result in a degradation indicator characterizing a local contamination or range impairment.

In particular, the degradation indicators can have a number of sub-indicators or a higher dimensions in order to describe the relevant degradation of a sensor system.

A model-based comparison for determining a fusion degradation indicator compares the sensor data and/or identified objects and/or properties of the identified objects using model knowledge about degradation phenomena.

For example, when a weather phenomenon is detected, the knowledge from one sensor system can be transferred to another sensor system, or knowledge can be mutually validated or deplausibilized. It can also be taken into account that due to current driving direction and/or installation positions of sensor system, this knowledge may be more or less degraded by, e.g., a wet sensor surface when there is rain. It can also be taken into account that, due to their design, different sensor modalities are influenced by the relevant weather phenomenon differently in range, angular errors, or the like.

For example, fog can be identified by a lidar system. If this lidar system performs a determination with radiation close to visible wavelengths, such as for example 900 nm, a measured atmospheric absorbance can be propagated substantially 1:1 to, for example, a camera system.

For example, a model-based comparison can take into account that, depending on a weather phenomenon, some sensors are able, due to their installation position, to detect and possibly measure the phenomenon. Here, other sensors may nevertheless be degraded by the weather phenomenon. In this case, the knowledge of the sensors installed favorably with respect to the weather phenomenon can be transmitted to all influenced sensors. For example, daytime fog can be effectively detected, via a brightness curve on a road, by a camera system oriented along the road, and the fog density can also be measured via a camera system oriented in this way. Data from laterally directed sensors equally impaired by the fog can be evaluated accordingly with the knowledge from the forward-directed sensors in order to determine a fusion blindness indicator.

The same holds for a detection of rain, since a laterally directed camera system may for example have more difficulty identifying rain than a forward-directed sensor system that can show rain clearly.

According to one aspect, it is proposed that the at least one environment-related determination variable in the object-based comparison is an object of the environment of the first and of the second sensor system.

According to one aspect, it is proposed that the model-based comparison of the at least one environment-related determination variable that is based on data of the first sensor system with the at least one environment-related determination variable that is based on data of the second sensor system is carried out with respect to model considerations about degradation processes of the first sensor system and of the second sensor system.

According to one aspect, it is proposed that the environment-related determination variable determined using a first sensor system of a first modality and the environment-related determination variable determined using a second sensor system of a second modality are compared with respect to a different effect of a degradation process acting on the two sensor systems According to one aspect, it is proposed that the first modality is different from the second modality.

According to one aspect, it is proposed that the sensor-specific degradation indicator is determined by an evaluation device of the first sensor system; and/or the perception blindness indicator is determined by a perception module of an evaluation device; and/or the fusion blindness indicator is determined by a fusion module of the evaluation device; and/or the degradation value of the first sensor system is determined by a detection module of the evaluation device.

The different modules can be configured to determine the respective blindness indicators with a clock rate such that a sensor degradation status can be determined for each provided data chunk, in order to avoid architecture-related delays.

A method is proposed in which, on the basis of a sensor degradation status of a first sensor system determined according to one of the methods described above, a control signal for controlling an at least partially automated vehicle is provided; and/or a warning signal for warning a vehicle occupant is provided on the basis of the sensor degradation status of a first sensor system.

The term "on the basis of" is to be understood broadly with respect to the feature that a control signal is provided on the basis of a sensor degradation status of a first sensor system. It is to be understood such that the sensor degradation status of the first sensor system is used for any determination or calculation of a control signal, which does not exclude other input variables also being used for this determination of the control signal. This applies correspondingly to the provision of a warning signal.

With such a control signal, the sensor degradation can be responded to differently, depending on a degree of the present degradation status of a sensor system. Thus, by means of the control signal, for example when there are clearance or washing functions, for example using spray nozzles and/or windshield wipers for a sensor surface, a cleaning process can be activated with different intensity in order to maintain system availability. Highly automated systems may also use the control signal to introduce a transition to a safe state. For example, in the case of an at least partially automated vehicle this can lead to a slow stop on the shoulder.

An evaluation device is proposed which is configured to carry out one of the methods described above for determining a sensor degradation status.

According to one aspect, a computer program is provided which comprises instructions that, when the computer program is executed by a computer, cause the computer to carry out one of the methods described above. Such a computer program allows the use of the described method in different systems.

A machine-readable storage medium is provided on which the above-described computer program is stored. The computer program described above is transportable by means of such a machine-readable storage medium.

BRIEF DESCRIPTION OF THE DRAWINGS

Embodiments of the disclosure are illustrated with reference to the FIGURE and explained in more detail below. In the drawings:

The FIGURE shows an evaluation device having a plurality of sensors.

DETAILED DESCRIPTION

The FIGURE schematically shows an evaluation device having a plurality of sensors 110 to 150 which, in addition to their sensor signal 110*a* to 150*a*, each provide a corresponding individual blindness indicator 110*b* to 150*b*.

Here, the sensor 110 is a video system, the sensor 120 is a radar system, the sensor 130 is a lidar system, the sensor 140 is an ultrasound system and the sensor 150 is a sound transducer system.

The sensors 110 to 150 are configured to determine a sensor-specific degradation indicator 110*b* to 150*b* using sensor data provided exclusively in each case by the relevant sensor system.

The sensor signals 110*a* to 150*a* for the representation of the environment are provided together with the individual blindness indicators 110*b* to 150*b* to a perception module 210 in order to determine a perception blindness indicator.

The respective sensors 110-150 are configured to use both existing sensor-internal information and raw sensor data of the relevant sensor to calculate degradation indicators using a relevant evaluation device. This can be a calculation of a signal quality in a radar system or can be a measurement of the membrane natural frequency in an ultrasonic system. However, already-existing signals can also be used as a degradation indicator, such as for example an optical flow in video sensors.

Using the provided sensor signals 110*a* to 150*a*, the perception module 210 determines an environment-related determination variable for the representation of an environment. In addition, for the sensor systems 110 to 150, the perception module 210 determines at least one perception blindness indicator for the relevant sensor system, on the basis of the relevant method for determining the environment-related determination variables, using the relevant sensor data, which are provided exclusively by the relevant sensor system.

The FIGURE shows the perception blindness indicator 210*a* for a first sensor system and the perception blindness indicator 210*b* for a second sensor system of the sensor systems 110 to 150.

The perception module 210 determines, using the data and information provided, the respective degradation indicators for the relevant sensor system 110-150. Here, the environment-related determination variables, on the determination of which the determination of the perception blindness indicators is based, can be more highly abstracted than the pure sensor data of the sensor systems 110 to 150. For example, the environment-related determination variables can have objects, features, stixels, dimensions of particular objects, types of objects, three-dimensional "bounding boxes," classes of objects, L-shapes and/or edges and/or reflection points of, for example, lidar systems, and many other items. In addition, objects can be tracked, i.e., their location can be temporally followed, by the perception module. For a radar system, for example, a number of tracked objects can be used for the determination of a perception blindness indicator. For a video system, for example, an output value of a classification that is determined using a neural network can be used for the determination of a perception blindness indicator.

The respective sensor signals 110*a* to 150*a* of the respective sensor systems 110 to 150 for the representation of the environment and the individual blindness indicators 110*b* to 150*b* of the respective sensor systems, and the perception blindness indicators of the respective sensor systems 110 to 150, are provided to the fusion module 310 in order to determine a fusion blindness indicator for the relevant sensor system 110 to 150.

Here, the relevant fusion blindness indicator 330 is determined for the relevant sensor system by means of a comparison of the at least one environment-related determination variable 320*a*, that is based on the provided data of a first sensor system of the sensor systems 110 to 150 with at least one environment-related determination variable 320*b* that is based on the provided data of a second sensor system of the sensor systems 110 to 150.

The environment-related determination variables are strongly abstracted in the fusion module 310, so that, for example, fused objects with object probabilities are formed from the objects or stixels. In addition, maps of the environment can be generated and/or updated and/or matched against map information from a database. Furthermore, abstracted information from all sensor systems is present.

The individual blindness indicators 110*b* to 150*b* of the respective sensor systems and the perception blindness indicators of the respective sensor systems 110 to 150, as well as the fusion blindness indicators of the respective sensor systems 110 to 150, are provided to an evaluation device 410, which determines a degradation value of the relevant sensor system 110 to 150 using these provided values.

The invention claimed is:

1. A method for determining a sensor degradation status of a first sensor system, which is configured to provide data for representing an environment of the first sensor system, the method comprising:
   receiving data of the first sensor system configured for representation of the environment;
   receiving data of a second sensor system configured for representation of the environment;
   determining an individual blindness indicator for the first sensor system on the basis of sensor data exclusively of the first sensor system;
   determining at least one first environment-related determination variable on the basis of the provided data of the first sensor system;
   determining at least one second environment-related determination variable on the basis of the provided data of the second sensor system;
   determining a fusion blindness indicator based on a comparison of the at least one first environment-related determination variable with the at least one second environment-related determination variable; and
   determining the sensor degradation status of the first sensor system based on the individual blindness indicator of the first sensor system and the fusion blindness indicator.

2. The method according to claim 1, wherein:
   the individual blindness indicator for the first sensor system has at least one of:
      a sensor blindness indicator determined based on sensor data provided exclusively by the first sensor system; and
      a perception blindness indicator determined on the basis of a method for determining environment-related determination variables based on sensor data provided exclusively by the first sensor system; and
   the determining of the sensor degradation status of the first sensor system includes determining the degradation status based on (i) the at least one of the sensor blindness indicator and the perception blindness indicator and (ii) the fusion blindness indicator.

3. The method according to claim 2, wherein the perception blindness indicator is determined by a perception module of an evaluation device.

4. The method according to claim 1, further comprising:
receiving at least one sensor-specific degradation indicator from the first sensor system; and
the determining of the sensor degradation status of the first sensor system is further based on the sensor-specific degradation indicator.

5. The method according to claim 4, further comprising:
calculating an indicator confidence measure for one or more of the at least one degradation indicator.

6. The method according to claim 4, wherein the sensor-specific degradation indicator is determined by an evaluation device of the first sensor system.

7. The method according to claim 1, wherein the first sensor system and the second sensor system have the same sensor modality and/or the first sensor system and the second sensor system have different sensor modalities.

8. The method according to claim 1, wherein the determining of the fusion blindness indicator for the first sensor system includes performing an object-based comparison and/or a model based comparison.

9. The method according to claim 8, wherein the at least one first and second environment-related determination variables in the object-based comparison are an object of the environment of the first sensor system and of the second sensor system.

10. The method according to claim 8, wherein the model-based comparison of the at least one first environment-related determination variable with the at least one second environment-related determination variable is carried out with respect to model considerations about degradation processes of the first sensor system and of the second sensor system.

11. The method according to claim 10, wherein:
the first environment-related determination variable is determined using a first modality of the first sensor system and the second environment-related determination variable is determined using a second modality of the second sensor system are compared
the model-based comparison includes comparing the first and second environment-related determination variables with respect to a different effect of a degradation process acting on the first and second sensor systems.

12. The method according to claim 11, wherein the first modality is different from the second modality.

13. The method according to claim 1, further comprising:
on the basis of the sensor degradation status of the first sensor system, generating at least one of (i) a control signal for controlling an at least partially automated vehicle and (ii) a warning signal for warning a vehicle occupant.

14. An evaluation device comprising:
at least one control device configured to carry out the method according to claim 1 for the determination of the sensor degradation status.

15. The method according to claim 1, wherein the method is performed by a computer when instructions of a corresponding computer program are executed by the computer.

16. A non-transitory machine-readable storage medium on which the computer program according to claim 15 is stored.

17. The method according to claim 1, wherein the fusion blindness indicator is determined by a fusion module of an evaluation device.

18. The method according to claim 1, wherein the degradation value of the first sensor system is determined by a detection module of an evaluation device.

* * * * *